July 17, 1962 B. E. L. KÄLLSSON 3,045,070

MULTIPLEX CARRIER FREQUENCY TRANSMISSION SYSTEM

Filed Aug. 21, 1957 2 Sheets-Sheet 1

INVENTOR
BENGT ERIK LENNART KÄLLSSON
BY Hane and Nydick
ATTORNEYS

July 17, 1962 B. E. L. KÄLLSSON 3,045,070

MULTIPLEX CARRIER FREQUENCY TRANSMISSION SYSTEM

Filed Aug. 21, 1957 2 Sheets-Sheet 2

INVENTOR.
BENGT ERIK LENNART KÄLLSSON

BY Hane and Nydell

ATTORNEYS

United States Patent Office
3,045,070
Patented July 17, 1962

3,045,070
MULTIPLEX CARRIER FREQUENCY TRANSMISSION SYSTEM

Bengt Erik Lennart Källsson, Bandhagen, Sweden, assignor to Telefonaktiebolaget L M Ericsson, Stockholm, Sweden, a corporation of Sweden
Filed Aug. 21, 1957, Ser. No. 679,441
Claims priority, application Sweden Aug. 23, 1956
3 Claims. (Cl. 179—15)

The present invention relates to multiplex carrier frequency transmission systems, and more particularly to a circuit arrangement for preventing the transmission of false intelligence signals to the receiver part of the system through the channels thereof due to unintended temporary interruptions in the transmission part of the system.

In multiplex transmission systems, for instance coaxial transmission systems, the speech frequencies in the two transmission directions are each transmitted over a transmission channel. For the transmission of signal information through the connection in question so-called voice frequency signalling systems are used. In telephone systems for example the signals which are to be transmitted may for instance consist of calling signals from an exchange to another, or dialling signals, clearing signals and answering signals.

For the transmission of such signals several systems are available, for instance voice frequency signalling within and outside the speech frequency band, the signalling being either continuous or discontinuous.

The invention is especially suitable for systems in which continuous signalling outside the speech frequency band is used.

The continuous signalling systems which have the simplest design are divided into two main groups, namely signalling systems with pause signals, for instance in the idle condition of the system, and signalling systems with signals during "speech," i.e. in the operated condition of the systems.

Systems with pause signals are characterized by the signalling frequency being transmitted during periods when signal information is not required. Signal information is thus obtained by interruptions of the signalling frequency (the signalling voice current).

Systems with signals during "speech" are characterized by the signalling frequency being transmitted during periods when signal information is required. In telephone communications the signalling frequency is thus transmitted during the entire period of communication.

The object of the invention is to eliminate the service disturbances due to short interruptions in the transmission part of the connections, caused by poor contacts, swinging etc. Such interruptions cause false signal information, which may cause faulty disconnections of communications, incorrect debiting, unauthorized mass calls causing the disconnection of automatic telephone exchanges etc. The term "mass calls" refers to a situation such that all the junction line relays are operated whereby all the registers of the telephone exchange are occupied, thus causing a congestion of the exchange.

According to the invention, said disadvantages and disturbances eliminated by providing a control circuit or a circuit for indicating interruptions arranged to maintain the receiver parts in its operating condition during short interruptions in the transmission part of the transmission system. The function of the control circuit, which must respond more rapidly than the receiver part, is controlled by one or more control frequencies.

In multiplex carrier frequency telephony with continuous signalling suitable pilot frequencies are used for the said indication of interruptions in addition to the normal functions of these frequencies, for instance for level adjustment. In coaxial transmission systems having so-called super-groups, each comprising sixty communication channels, the pilot frequency (super-group pilot) of the sixty-channel group may be used for controlling the voice frequency circuits. This may be done with simple means by completing the sixty-channel group equipments and by slightly modiyfing the individual channel equipments.

The invention will be described more in detail in connection with the drawings.

The invention will now be described as used in a coaxial transmission system.

In a known multichannel system of this kind the different communication channels are combined in groups of twelve channels, which groups in turn are combined five and five to sixty-channel groups or super-groups. Sixteen such super-groups are provided.

Figure 1:
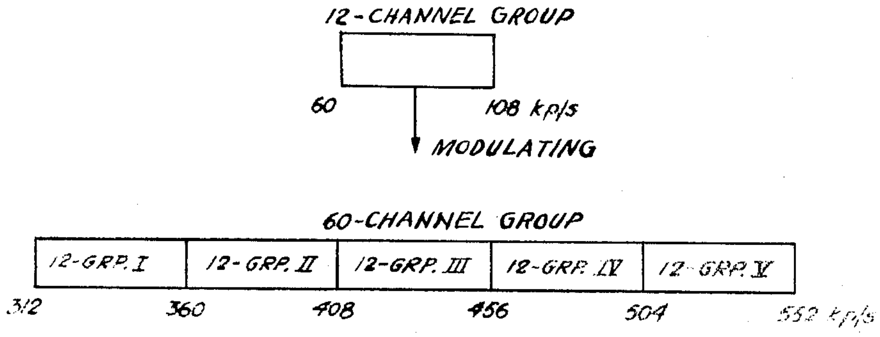
FIG. 1 shows the frequency range of the twelve-channel groups within a super-group in a coaxial transmission system.

Each communication channel has a band width of 4 kc./s. and all twelve-channel groups are located within the frequency band 60–108 kc./s. When combined to super-groups the twelve-channel groups, as appears from FIG. 1, are modulated in such a way that the five twelve-channel groups comprised in the sixty-channel group occupy the frequency ranges 312–360, 360–408, 408–456, 456–504 and 504–552 kc./s., respectively. In FIG. 1 these five twelve-channel groups in the sixty-channel group have been indicated by rectangles marked 12 grp. I . . . 12 group V.

Figure 2:
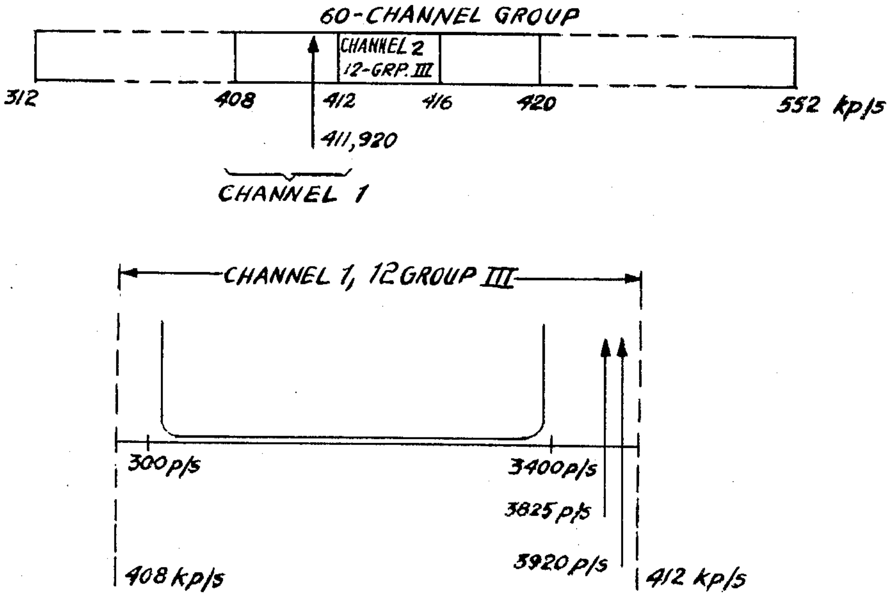
FIG. 2 illustrates a super-group some of the individual channels of which are marked, one channel being shown on an enlarged scale, the pilot frequency, the signalling frequency and the voice frequency range of said channel being indicated.

In FIG. 2 a sixty-channel group is shown in which some of the communication channels are marked on an enlarged scale. More precisely, the three lowest channels within the twelve-channel group 12 group III are indicated, the intermediate one of these being indicated by the legend "channel 2, 12 group III." Hence the channel located to the left is the channel No. 1 in the third twelve-channel group, while the one located to the right is channel No. 3 in the same twelve-channel group. The frequency ranges of these three channels are 408–412, 412–416 and 416–420 kc./s., respectively. In the channel No. 1 (408–412 kc./s.) the pilot frequency 411, 920 kc./s. is indicated, which normally controls the level within the whole sixty-channel group and which, when faults arise, initiates the alarm signal.

At the bottom of FIG. 2 the channel 408–412 kc./s. is shown on a larger scale, the channel limits being indicated at 408 and 412 kc./s., respectively. The part of the frequency spectrum used for communications includes the range 300–3400 c./s. (or more exactly 408, 300–411, 400 kc./s.). The signalling frequency is 3825 c./s. and is individual for said channel and the above mentioned pilot frequency is 3920 c./s. (properly 411, 920 kc./s.) and common to the said sixty-channel group.

Figure 3:
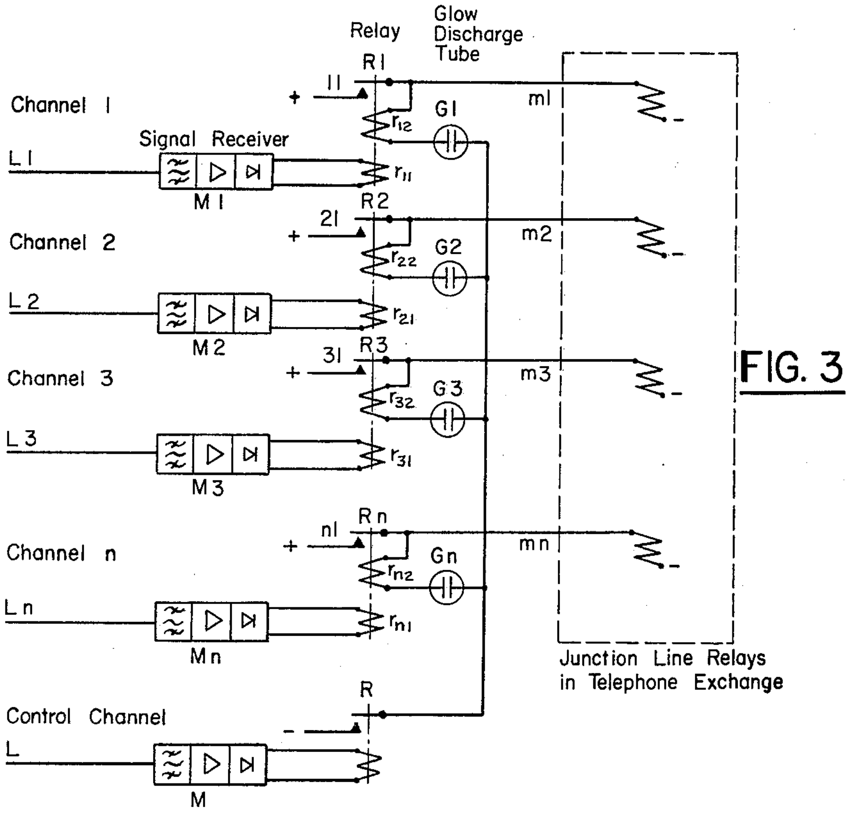
FIG. 3 shows the application of the invention to signalling with signals during speech.

In FIG. 3 the signal equipments for three channels are shown besides the control channel for the super-group in the terminal equipment of a coaxial transmission system. The three signal channels have been indicated by "channel 1," "channel 2" and "channel *n*," respectively.

L1, L2 and L*n*, respectively, indicate the incoming lines to the voice frequency receivers M1, M2 and M*n*, respectively. These lines transmit the signalling frequency 8325 c./s. which, as is indicated above, is used for call signalling, dialling etc. To each voice frequency receiver there is connected a relay R1, R2 and R*n*, respectively, which repeats the information obtained in the voice frequency receivers from the lines L1, L2 and L*n*, respectively, to the signal conductors *m*1, *m*2 and *mn*, respectively, by feeding positive pulses to these conductors from the contacts 11, 21 and *n*1, respectively of the respective relays. The last mentioned conductors lead to the not shown telephone exchanges.

At the bottom of FIG. 3 the control channel is illustrated. The line L transmits the control frequency 3920 c./s. to a voice frequency receiver M. As has been mentioned before, the control frequency in this case consists of the pilot frequency for the said super-group. R indicates a very rapidly working relay, which is provided with static connection, i.e. the function of the relay is without slow release. The relay R may for example be electronic. To the relay R one pole of the glow discharge tubes G1, G2 and G*n*, respectively, is connected. The second pole of these glow discharge tubes is connected via the auxiliary winding *r*12, *r*22 and *rn*, respectively of the respective relays R1, R2 and R*n* to the conductors *m*1, *m*2 and *mn*, respectively.

The channel 1 is shown in FIG. 3 in a position for communication, while the channels 2 and *n* are not operated. The channel 1 has positive potential on the conductor *m*1 when affected by the corresponding voice frequency receiver M1 and the main winding *r*11 of the relay R1.

The operation of the system is as follows if an interruption arises in the transmission part.

In such event the control frequency 3920 c./s. is disconnected, the voice frequency receiver M changing the circuit to relay R in a manner that this relay applies negative potential to its output line, the one pole of the glow discharge tubes thereby receiving negative potential. In the channel 1, which as indicated above is in position for communication, the conductor *m*1 has positive potential via the contact 11. The second pole of the glow discharge tube G1 will thus receive positive potential via the winding *r*12 of the relay. When the voltage difference is higher than the ignition voltage of the glow discharge tube the tube will be ignited, a current thereby passing through the winding *r*12. This current induces a flux in the relay R1 sufficient to retain the relay spring in an unaltered position. When an interruption arises in the signal channel of the transmission part, the voice frequency receiver M1 will thus break the current to the main winding *r*11 of the relay R1. As the relay R in the control channel responds more rapidly than the relay R1, the conductor *m*1 will now also have positive potential. If, after a shorter interval of time, the interruption terminates, for example, the control frequency and the frequencies of the signal channels return, the main winding *r*11 is again energized. The current to the winding *r*12 is maintained either by the winding having a delayed action when the relay releases, or by the relay R of the control channel having delayed action when releasing.

The glow discharge tubes G1, G2 and G*n*, respectively, serve to separate galvanically the *m*-wires of the different channels from each other.

Figure 4:
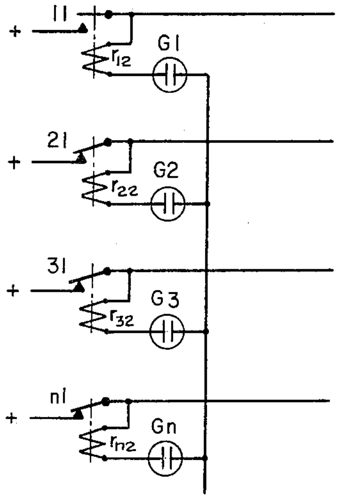
FIG. 4 shows a modification of FIG. 3 which permits use of the invention for signalling with pause signals.

In FIG. 4 is shown how the system shown in FIG. 3, which operates with signals during speech, can be adapted to operation with pause signals. The reference numerals of this figure correspond to those of FIG. 3 and a communication is supposed to be in progress in the channel 1. It is apparent such adaptation merely requires that the contact springs 11, 21, and *n*1, respectively, are located in a manner opposite to that of FIG. 3.

The invention may be modified in different manners and it is apparent that it is not limited to systems of the coaxial transmission type but may be used just as well within other ranges, for instance, in radio link transmission systems with corresponding signalling and in voice frequency telegraph equipments.

I claim:

1. In a multiplex carrier frequency transmission system including a transmission part, a receiver part, a plurality of channels arranged in sub-groups and main-groups, a pilot frequency being assigned to each of said main-groups and in which false intelligence signals may be transmitted to said receiver part of the system through said channels due to unintended temporary interruptions in the transmission part of a signal transmitting connection of the system, a control circuit provided for each main-group, each of said control circuits including a first relay means controlled by the pilot frequency assigned to the respective main-group, each of said channels in the sub-groups including a signal conductor and each of said first relay means being arranged and connected to maintain the potential of the respective signal conductor substantially constant when the respective pilot frequency is temporarily interrupted, second relay means for each channel, each of said second relay means having a main coil and an auxiliary coil, each main coil being connected to be energized during the transmission of intelligence signals, and said first relay means being arranged to connect auxiliary coils of said second relay means associated with operated channels in an energizing circuit in response to a temporary interruption of the pilot frequency in operated channels, said first relay means having a shorter reaction time than said second relay means at the beginning of an interruption and a delayed reaction time at the end of an interruption, whereby the state of the receiver is maintained unchanged during temporary interruptions.

2. A transmission system according to claim 1 and further comprising a unidirectionally conducting circuit means for each channel, each of said circuit means having an input terminal and an output terminal, said first relay means being connected to one terminal of each of said circuit means, the other terminal of each circuit means being connected to the auxiliary coil of the respective second relay means to control the energizing circuit for the respective auxiliary coil.

3. A transmission system according to claim 2 wherein each of said unidirectionally conducting circuit means comprises a glow discharge tube, ignition and extinction of each of said tubes controlling the energizing circuit for the respective auxiliary coil.

References Cited in the file of this patent

UNITED STATES PATENTS

| | | |
|---|---|---|
| 2,329,519 | Dixon | Sept. 14, 1943 |
| 2,613,279 | Huralt | Oct. 7, 1952 |
| 2,757,239 | Patton | July 31, 1956 |
| 2,782,258 | Stalemark et al. | Feb. 19, 1957 |
| 2,790,029 | Hanson | Apr. 23, 1957 |
| 2,816,168 | Morris et al. | Dec. 10, 1957 |

OTHER REFERENCES

Appendix of Federal Communications Commission in the matter of: Amendment of Part III of the Commission's Rules To Provide for Subscription Television Service. Appendix to comments of Zenith Radio Corporation and TECO, Inc. (Received at the Patent Office on June 21, 1955.)